US012530461B2

United States Patent
Yang et al.

(10) Patent No.: US 12,530,461 B2
(45) Date of Patent: Jan. 20, 2026

(54) SYSTEM AND METHOD FOR FIRMWARE UPDATE ON EXECUTE-IN-PLACE (XIP) SYSTEMS

(71) Applicant: Beken Corporation, Shanghai (CN)

(72) Inventors: Pujie Yang, Shanghai (CN); Zhifu Liu, Shanghai (CN); Zhilei Wang, Shanghai (CN)

(73) Assignee: Beken Corporation, Shanghai (CN)

( * ) Notice: Subject to any disclaimer, the term of this patent is extended or adjusted under 35 U.S.C. 154(b) by 28 days.

(21) Appl. No.: 18/663,802

(22) Filed: May 14, 2024

(65) Prior Publication Data
US 2025/0298900 A1 Sep. 25, 2025

(30) Foreign Application Priority Data

Mar. 25, 2024 (CN) .......................... 202410347887.5

(51) Int. Cl.
*G06F 21/57* (2013.01)
(52) U.S. Cl.
CPC .................................. *G06F 21/572* (2013.01)
(58) Field of Classification Search
None
See application file for complete search history.

(56) References Cited

U.S. PATENT DOCUMENTS 5,754,817 A * 5/1998 Wells .................. G06F 9/44573
711/115
2020/0301698 A1* 9/2020 Rosner .................... G06F 12/10

* cited by examiner

*Primary Examiner* — Jeffrey C Pwu
*Assistant Examiner* — Mayasa A. Shaawat
(74) *Attorney, Agent, or Firm* — Schwegman Lundberg & Woessner, P.A.

(57) ABSTRACT

A system and method for firmware updates on Execute-in-Place (XIP) devices with multiple memory partitions is disclosed. Firmware files include instructions coded to one of the partitions, while another partition runs the active firmware. An address remapping technique redirects the fetching addresses in the instructions to the partition storing the active firmware, so the instructions may be executed properly when the firmware files are installed in either partition. As a consequence, the firmware update file only requires one version, instead of multiple versions for multiple partitions, and this simplifies the firmware update process, such as compatibility verification and version control, saves memory space on the server, and reduces bandwidth usage.

20 Claims, 6 Drawing Sheets

SYSTEM AND METHOD FOR FIRMWARE UPDATE ON EXECUTE-IN-PLACE (XIP) SYSTEMS

CROSS-REFERENCE TO RELATED APPLICATIONS

This application claims priority to and incorporates by reference Chinese patent application no. 202410347887.5 filed 25 Mar. 2024.

TECHNICAL FIELD

The present disclosure relates to the technical field of firmware updates for electronic devices. More specifically, it pertains to systems and methods for updating firmware in Execute-in-Place (XIP) systems.

BACKGROUND

Firmware is a class of computer software that provides control for the hardware of a device. Updates to firmware are often necessary to improve functionality, incorporate new features, or address security vulnerabilities. Execute-in-Place (XIP) systems are designed to run software directly from non-volatile memory. In these systems, firmware update files are directly downloaded to the non-volatile memory. XIP systems generally face constraints in processing power, memory space, and network bandwidth.

BRIEF SUMMARY

A method for firmware update involves determining a boot partition of a memory of an Execute-in-Place (XIP) system, where the memory includes a first partition and a second partition, and the boot partition contains a plurality of instructions coded with first partition addresses. It also includes determining that the boot partition is the second partition. Upon determining that the boot partition is the second partition, the method includes redirecting one or more processors of the XIP system to execute the plurality of instructions from the second partition, storing a firmware update file in the first partition, which comprises a plurality of updated instructions coded with first partition addresses, and setting the first partition to be the boot partition in response to the XIP system restarts.

In an embodiment, an Execute-in-Place (XIP) system comprising a memory with a first and second partition and one or more processors is claimed. This hardware system is configured to perform the steps of determining the boot partition, redirecting the processors to execute instructions from the determined boot partition, storing a firmware update file in the non-boot partition, and setting the non-boot partition to be the boot partition upon system restart to perform these steps.

In another embodiment, a non-transitory computer-readable storage medium containing instructions that, when executed by an Execute-in-Place (XIP) system, causes the system to perform the steps of determining the boot partition, redirecting the processors to execute instructions from the determined boot partition, storing a firmware update file in the non-boot partition, and setting the non-boot partition to be the boot partition upon system restart.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

The present invention relates to a system and method for firmware updates on XIP systems (e.g., XIP devices, imbedded systems, IoT devices) that includes multiple memory partitions. We recognize a need for a firmware update process that is efficient and practical for XIP systems.

In some examples, an XIP system has a first partition and a second partition. The XIP may currently be running on either the first partition or the second partition. The partition on which the XIP system is currently running is identified as the boot partition, and the other partition is referred to as "non-boot partition." The non-boot partition may be used to store a firmware update file. An example approach to perform firmware updates for XIP systems is as follows: 1) identifying the boot partition; 2) communicating the identified boot partition to a server; 3) the server sends a version of the firmware update file specific to the non-boot partition. In this approach, the server needs to store two or more versions of the firmware update file specific to different partitions (e.g., one for the first partition and another version for the second partition). Alternatively, the server may send all versions of the firmware update file to the XIP system.

Embodiments address the technical problems that arise when trying to perform firmware updates on XIP systems that have multiple partitions in memory. Specifically, the firmware update file may include a plurality of instructions associated with the first partition only, that is, the plurality of instructions includes only first partition addresses. When the current boot partition is the second partition, the first partition addresses included in the plurality of instructions are remapped to addresses of the second partition, the current boot partition.

As a consequence, only one firmware version needs to be stored on the firmware update server 104. The boot partition identification is performed locally, without needing to communicate it to the firmware update server 104, as explained in step 2) above. The firmware update may be installed on any non-boot partition.

This simplifies the process of updating multiple XIP systems that may have multiple different boot partitions. It simplifies the firmware update process, saves memory space on the server, and reduces bandwidth usage.

Figure 1:
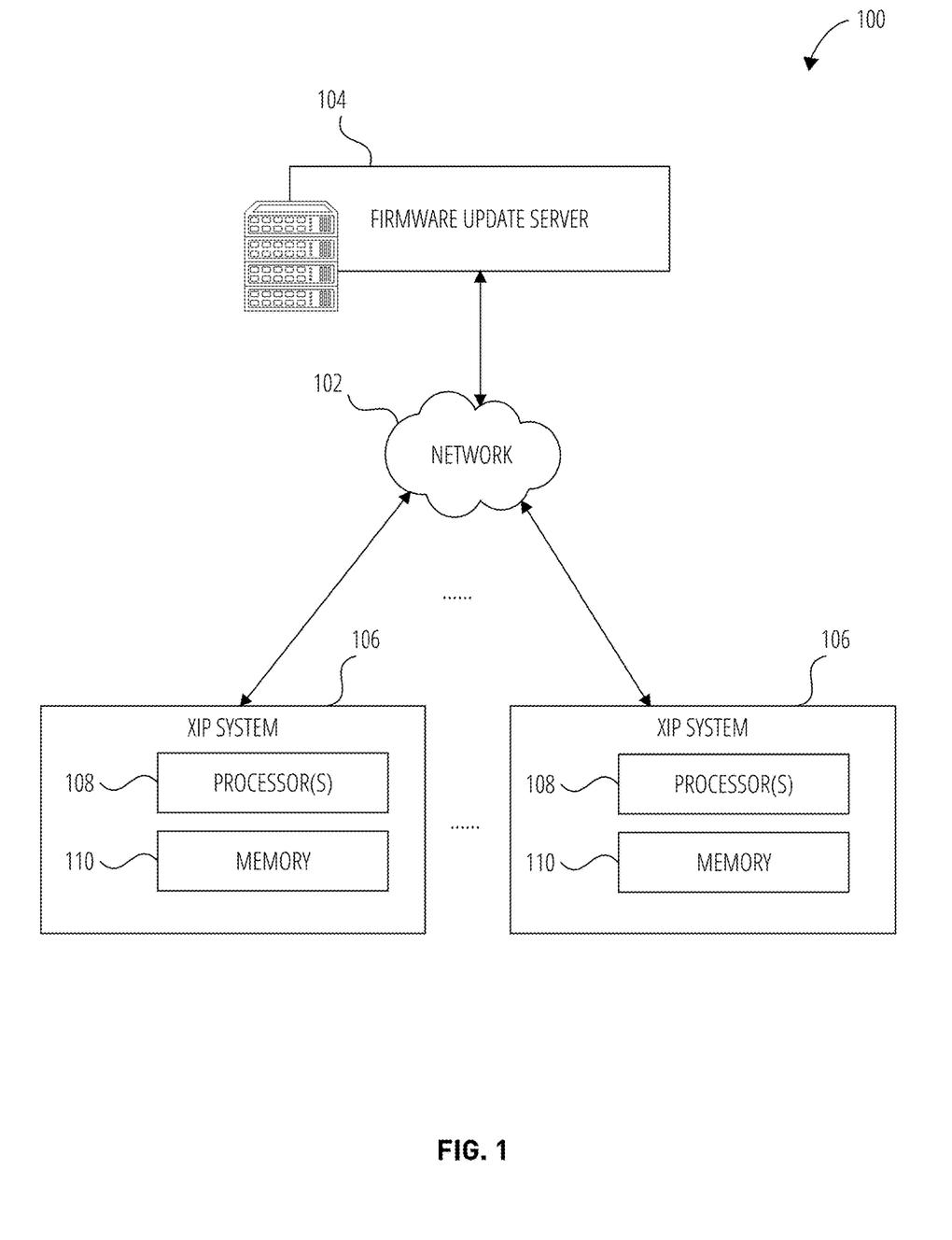
FIG. 1 is a diagrammatic representation of a firmware update environment 100, according to some examples.

FIG. 1 is a diagrammatic representation of a firmware update environment 100, according to some examples.

Firmware update environment 100 includes one or more firmware update servers (e.g., firmware update server 104) and one or more XIP systems (e.g., XIP system 106), and the one or more firmware update servers are coupled to the XIP systems via a network (e.g., network 102). In some examples, firmware update server 104 is coupled to two XIP systems 106 via network 102.

Network 102 provides connectivity between the firmware update server(s) 104 and the XIP system(s) 106 to facilitate firmware updates. Network 102 may be but not limited to local area network (LAN), wide area network (WAN), wireless network (e.g., Wi-Fi networks, cellular networks, Bluetooth), Internet, Intranet, virtual private network (VPN), storage area network (SAN), personal area network (PAN). Network 102 may include a combination of local networks, wider area networks, wireless connections, and/or the public internet to provide data transmission between firmware update server 104 and XIP systems 106.

Firmware update server 104 distributes firmware updates to XIP systems 106 via network 102. Firmware update server 104 may be a centralized hub that stores firmware update files, maintain firmware versions, controls the rollout of updates, and transmits the firmware update files and installation instructions to target devices. The firmware update files may include security patches, bug fixes, and/or feature enhancements, etc. Firmware update server 104 may provide other server-side functionalities other than providing firmware updates to the XIP systems 106.

XIP system 106 includes one or more processors (e.g., processor(s) 108) and one or more memory (e.g., memory 110). XIP system 106 may execute instructions directly from memory/storage without first loading them to random access memory (RAM). XIP systems 106 receive firmware updates from firmware update server 104 via network 102. XIP system 106 may be or exist in, but not limited to, Internet-of-Things (IoT) devices, industrial equipment (e.g., manufacturing machinery, power/utility systems, medical devices), vehicles (e.g., automobiles, aircraft, boats with integrated computer systems), computing devices (e.g., laptops, tablets, desktops, servers, networking hardware), mobile devices (e.g., smartphones, watches, wearable devices), smart home devices (e.g., connected lighting, locks, thermostats, appliances), and embedded systems (e.g., microcontrollers, integrated circuits, real-time computing systems, and other self-contained applications with dedicated functionality), etc. In some examples, the XIP system 106 does not include a hardware memory management unit (MMU). The XIP system 106 relies on the firmware stored in the memory 110 to manage memory access without the MMU. As noted above, the XIP system 106 may execute instructions directly from the non-volatile memory 110 without first loading instructions into random access memory (RAM). Performing reliable firmware updates is therefore critical for these XIP systems 106 lacking MMU hardware. The methods and systems described herein deliver such reliable update capabilities through the address remapping technique despite the absence of the MMU. In some examples, XIP system 106 is a machine 600 described in FIG. 6.

In some examples, processor(s) 108 may be a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof. The term "processor(s)" is intended to include multi-core processors that may comprise two or more independent processors (sometimes referred to as "cores") that may execute instructions contemporaneously. XIP system 106 may include a single processor with a single-core, a single processor with multiple cores (e.g., a multi-core processor), multiple processors with a single core, multiple processors with multiples cores, or any combination thereof.

Memory 110 may include a non-volatile memory, accessible to processor(s) 108. Memory 110 may include firmware update files. Details about memory 110 will be discussed in the description to FIG. 2.

Figure 2:
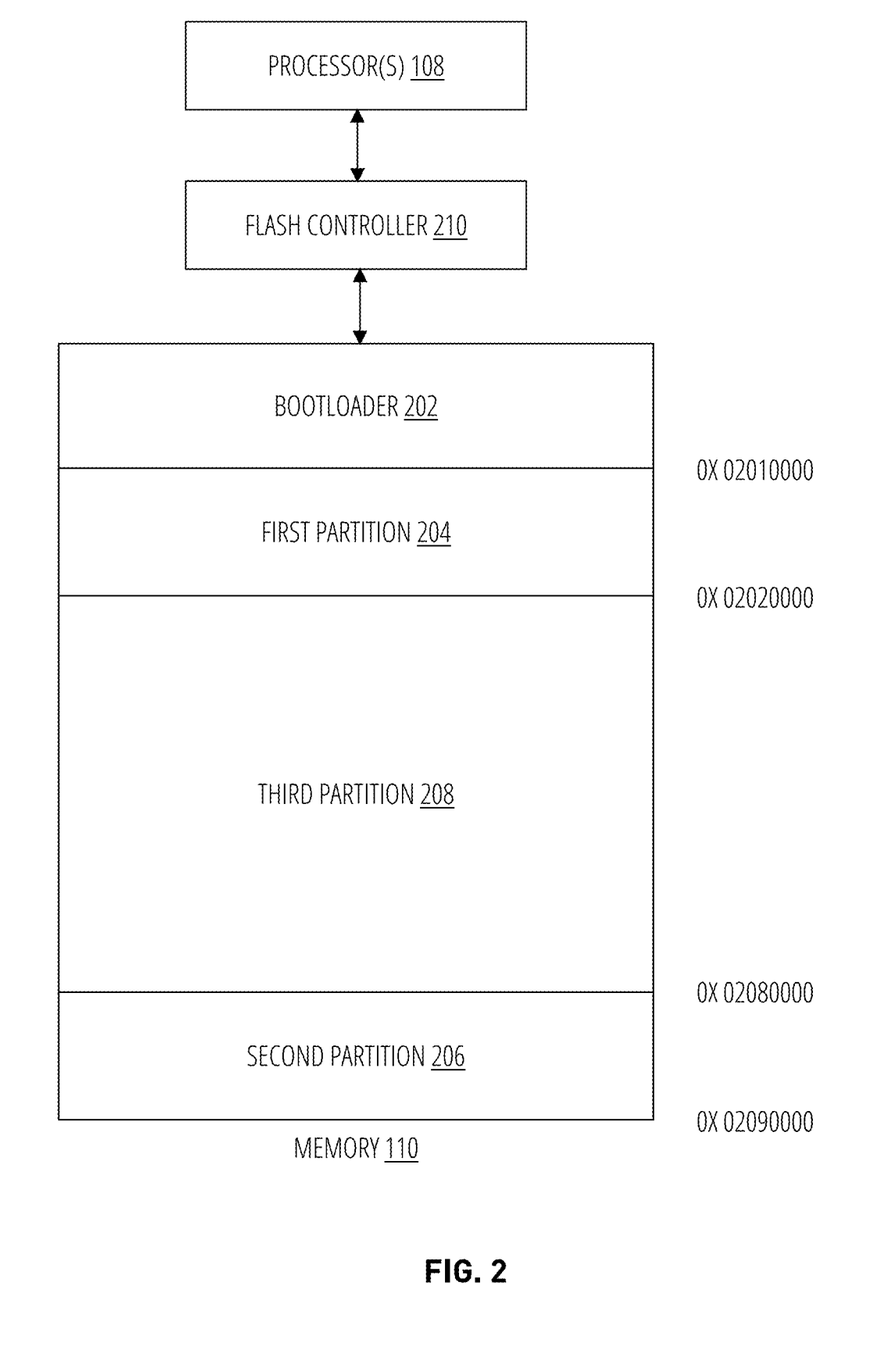
FIG. 2 is a diagrammatic representation of an XIP system, according to some examples.

FIG. 2 is a diagrammatic representation of an XIP system, according to some examples. The memory of the XIP system may include one or more processors (e.g., processor(s) 108), a Flash controller (e.g., Flash controller 210), a memory (e.g., memory 110), a bootloader (e.g., bootloader 202), and one or more partitions in the memory (e.g., first partition 204, second partition 206, and third partition 208).

Memory 110 may be a non-volatile memory that includes executable code. The executable code is not copied into random-access memory (RAM) before execution by processor(s) 108. Instead, processor(s) 108 executes the code directly from the memory. In some examples, the memory may be Flash memory, Memory 110 may be divided into different partitions to isolate specific functions and data. For example, one partition storing an original firmware can be designated as a boot partition. Another partition can store newly received firmware update file(s), allowing the XIP system to continue running uninterrupted because the boot partition remains untouched while a firmware update is written to a separate partition.

The memory partitions provide separation among different types of information. For example, the user data may be stored in third partition 208, while the second partition 206 may be the boot partition and first partition 204 may be a non-boot partition used to store firmware update file(s).

Flash controller 210 may be a hardware device or a microcontroller that manages the storage and retrieval of instructions or data to and from the memory 110. In some examples, the Flash controller 210 comprises a processing circuit for controlling write processes and fetch processes to write/fetch instructions/data using techniques described herein. In some examples, the Flash controller 210 causes external processing circuits (e.g., processor(s) 108) to write/fetch instructions/data. In some additional examples, the Flash controller 210 uses a combination of the processing circuit and external processing circuits to perform write and fetch processes.

Bootloader 202 may identify the boot partition comprising the firmware to be executed by the processor(s) 108. Bootloader 202 may be the first piece of code executed by the processor(s) 108 at startup, and bootloader 202 may load the operation system from the boot partition so that the operation can take over. In some example XIP systems, there is only firmware and no operation system, and processor(s) 108 executes the firmware directly from non-volatile memory. In these examples, bootloader 202 identifies the firmware in the boot partition and directs processor(s) 108 to execute the firmware by identifying the boot partition and communicating the identification to a memory controller (e.g., Flash controller 210). Bootloader 202 may be stored in any partition of the memory.

First partition 204 and second partition 206 may take turns to be configured to be the boot partition. The boot partition is the partition comprising the current firmware. If one of the two is a boot partition, the other partition may be referred to as "non-boot partition," which may be used to store any newly received firmware update file. In other words, if first partition 204 is the boot partition, then the second partition 206 is the partition reserved for storing the firmware update file(s), and vice versa.

Because first partition 204 and second partition 206 need to work together in a firmware update process described above, first partition 204 may be of the same size as second partition 206, that is, first partition 204 and second partition 206 have the same number of memory locations. Additionally, each memory location in first partition 204 has a corresponding memory location in second partition 206 so that each memory address can be mapped to each other. In an example illustrated in FIG. 2, first partition 204 includes 65,536 memory addresses starts from address 0x 02010000 and ends at 0x 02020000, and second partition 206 also includes 65,536 memory address starting from 0x 02080000 to 0x 02090000. In some examples, memory address 0x 0201 0000 in first partition 204 corresponds to memory address 0x 02080000 in second partition 206.

Third partition 208 may be a partition in between first partition 204 and second partition 206. Third partition 208 may include memory addresses between 0x 02020000 and 0x 02080000. Third partition 208 may include other information that is neither an operation system nor a firmware.

Figure 3:
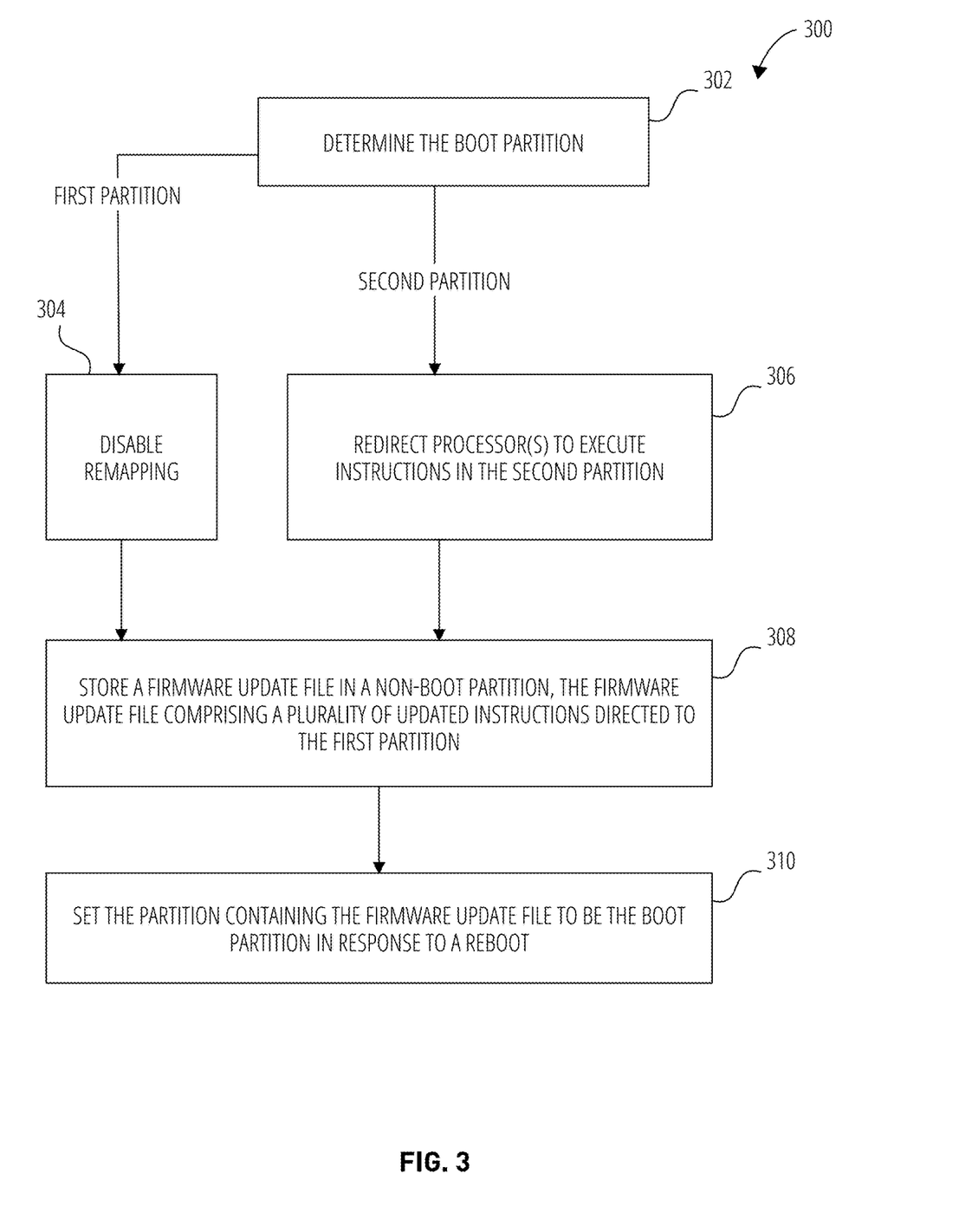
FIG. 3 a flowchart illustrating a method for performing a firmware update, according to some examples.

FIG. 3 is a flowchart illustrating a method 300 for performing a firmware update, according to some examples.

In block 302, XIP system 106 identifies the boot partition in memory 110. XIP system 106 may identify the boot partition using bootloader 202. If first partition 204 is the boot partition, then XIP system 106 proceeds to block 304; if second partition 206 is the boot partition, then XIP system 106 proceeds to block 306.

Figure 4:
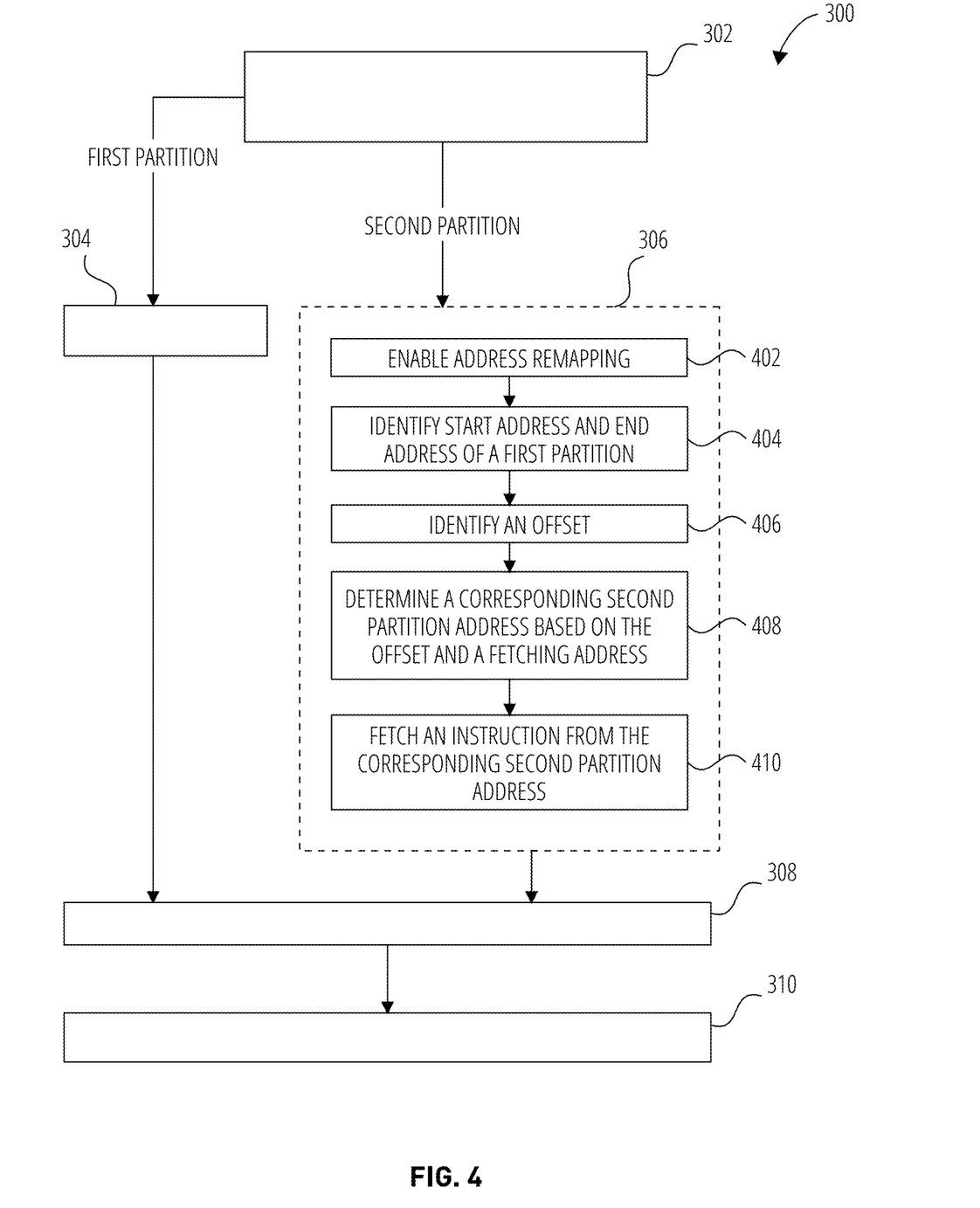
FIG. 4 is a flowchart illustrating block 306 for redirecting processor(s) to execute instructions from the second partition, according to some examples.

In block 304, XIP system 106 disables address remapping. In some examples, to disable address remapping, XIP system 106 stores (e.g., assigns, saves, keeps) a Boolean value indicating whether address remapping has been enabled. For example, a Boolean value named addr_remap is stored in a register of the processor(s) 108. When address remapping is disabled, addr_remap has the value of "false" (e.g., a false value), indicating that a fetching address does not need to be remapped before reading or executing the data and/or instructions from the fetching address. Address remapping may convert (e.g., remaps, translates, redirects) the memory addresses of the first partition (i.e., first partition addresses) to memory addresses of the second partition (i.e., second partition addresses). For example, when address remapping is enabled, 0x 02010000, which is a first partition address, is converted to 0x 02080000 to allow processor(s) 108 to execute instructions from 0x 02080000 instead of 0x 02010000. If the first partition 204 is the boot partition, address remapping is unnecessary: the firmware is coded with first partition addresses (e.g., an instruction involving executing the instruction from address 0x 02010000), so the firmware instruction can be executed directly from the first partition. In response to identifying that the second partition 206 is the boot partition, the XIP system 106 enables address remapping in block 402, which is discussed below.

In block 306, XIP system 106 redirects the processor(s) 108 to execute instructions in the second partition. The redirection enables the XIP system to fetch from the second partition wherein the firmware is currently running, and the firmware currently running is coded with the first partition addresses. More details about block 306 are discussed below.

In block 308, XIP system 106 receives a firmware update file from firmware update server 104 and stores the firmware update file in the non-boot partition. The firmware update file includes instructions coded with the first partition addresses.

In block 310, XIP system 106 sets the non-boot partition comprising the firmware update file to be a boot partition the next time the XIP system 106 starts up (e.g., starts, boots up, powers on, activates, goes live) after a reboot (e.g., restart, a shut down followed by a boot up). For example, the second partition 206 is currently the boot partition, the first partition is currently the non-boot partition, and the firmware update file is saved in the first partition 204. In response to the firmware update file being saved in the first partition 204, XIP system 106 may set the first partition 204 to be the boot partition the next time XIP system 106 boots up. In other words, next time when the XIP system 106 boots up, the first partition would be the boot partition, and the second partition would be the non-boot partition reserved for storing yet another firmware update file.

FIG. 4 is a flowchart illustrating block 306 for redirecting processor(s) 108 to execute instructions in the second partition, according to some examples.

Block 306 further comprises blocks 402, 404, 406, 408, and 410. In response to determining that the second partition 206 is the boot partition in block 302, the XIP system proceeds to block 306.

In block 402, XIP system 106 enables address remapping in response to determining that the second partition 206 is the boot partition. In some examples, to enable address remapping, XIP system 106 stores (e.g., assigns, saves, keeps) a Boolean value indicating whether address remapping has been enabled. For example, a Boolean value named addr_remap is stored in a register of the processor(s) 108 (e.g., a first register). When address remapping is enabled, addr_remap has the value of "true" (e.g., a true value), indicating that a fetching address needs to be remapped before reading or executing the data and/or instructions from the fetching address. Processor(s) 108 may have four or more registers for storing the Boolean value and other data.

In block 404, the XIP system 106 may identify and store a first partition start address, which is the first memory address of the first partition 204, and a first partition end address, which is the last memory address of the first partition. For example, first partition 204 ranges from 0x 02010000 to 0x 02080000, then the first partition start address is 0x 02010000 and the first partition end address is 0x 0208 0000. In some examples, XIP system 106 stores the first partition start address and the first partition end address to two separate registers of the processor(s) 108 so that XIP system 106 may identify fetching addresses that are first partition addresses by determining whether the fetching addresses fall within a range of the first partition start address and the first partition end address (e.g., an address range of the first partition). For example, a fetching address associated with a fetch instruction is 0x 02090000; because 0x 02090000 does not fall within the address range of the first partition, it is not a first partition address, therefore, XIP system 106 would not remap this fetching address. In some examples, the first partition start address and the first partition end address are predetermined.

In block 406, XIP system 106 identifies an offset between the first and second partitions. The offset may indicate a distance between a first partition address and its corresponding second partition address. For example, if 0x 02010000 is a first partition address and its corresponding second partition address is 0x 02080000, then their offset would be 0x 02080000-0x 02010000=0x 70000, or 458,752 in decimal. In some examples, the sizes and locations of the first partition and the second partition are predetermined, therefore, the offset is also known. In other examples, the sizes of the first partition and the second partitions are the same so that each memory location has a corresponding memory address in the other partition.

In block 408, the XIP system 106 may determine the corresponding second partition address based on the offset and the fetching address associated with the fetch instruction. For example, if the fetching address associated with the fetch instruction is a first partition address (e.g., 0x 02010000). After remapping the fetching address to the corresponding second partition address (e.g., 0x 02080000), the XIP system fetches and executes the instruction based on the corresponding second partition address. For example, a fetch instruction is associated with a fetching address of 0x 02030000, a first partition address, and a corresponding second partition address is 0x 02030000+offset, that is 0x 02030000+0x 70000=020A0000.

In some examples, the XIP system 106 checks if the fetching address associated with the fetch instruction falls within the first partition start address and the first partition end address identified in block 404, indicating the fetching address is a first partition address. In response to determining that the fetching address is a first partition address, the XIP system 106 then determines the corresponding second partition based on the offset and the fetching address. In other words, fetching addresses that are not first partition addresses would not be remapped (e.g., converted). For example, a fetching address that is associated with the third partition would not be remapped so that the processor(s) 108 may fetch data from the third partition directly.

In block 410, the XIP system 106 fetches an instruction based on the corresponding second partition address or an original fetching address (i.e., a fetching address that does not need to be remapped). In some examples, block 306 may be performed by the Flash controller 210. Remapping of the fetching address is transparent to the processor(s) 108. In other words, the processor(s) 108 would execute instructions or fetch data from the fetching address provided by the Flash controller 210, whether the fetching address has been converted. If the boot partition is the second partition, the processor(s) 108 may "think" that it is interacting with the first partition, but due to remapping, it's actually executing instructions stored in the second partition.

Figure 5:
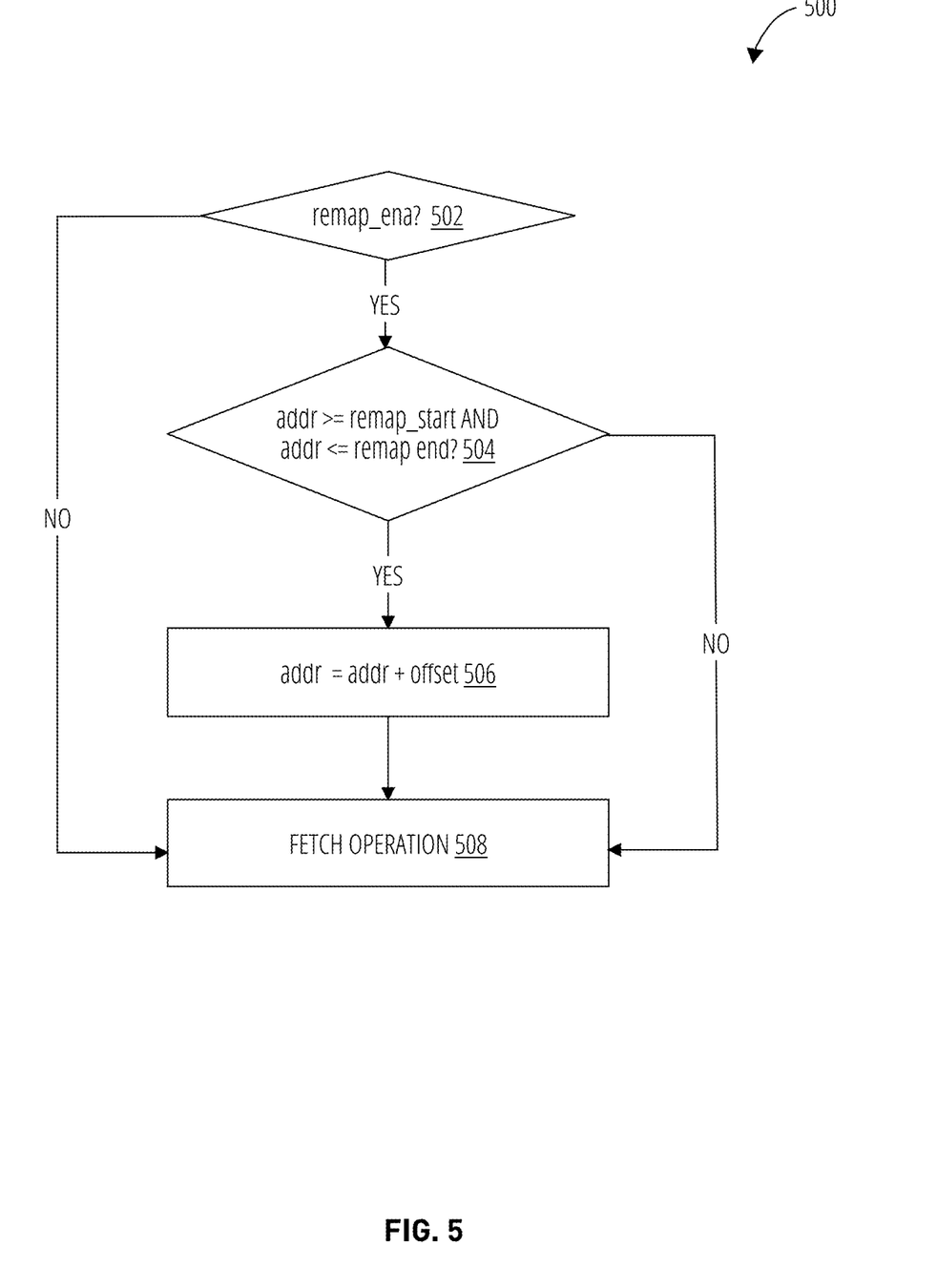
FIG. 5 a flowchart illustrating the method for performing the firmware update from the perspective of one or more processors, according to some examples.

FIG. 5 is a flowchart illustrating method 300 for performing a firmware update from the perspective of the processor(s) 108, according to some examples. In the example illustrated in FIG. 5, method 300 includes decision block 502, decision block 504, block 506, and block 508.

As explained previously, the XIP system 106 has a first partition and a second partition in the memory 110. One of these partitions contains the active firmware and is designated as the "boot partition." When the second partition is the active boot partition, fetch operations targeting the first partition need to be redirected to instead fetch instructions from the second partition. This remapping may be achieved by converting first partition addresses into the corresponding second partition addresses. For example, address 0x02010000 in the first partition may correspond to address 0x02080000 in the second partition. Therefore, a fetch targeting a first partition address would be remapped to target a second partition address instead.

In decision block 502, the processor(s) 108 checks if address remapping has been enabled by checking the Boolean variable 'remap_ena' stored in a register of the processor(s) 108. If yes, remapping is enabled (e.g., active), the processor(s) 108 proceeds to decision block 504. If no, remapping is disabled (e.g., inactive), the processor(s) 108 proceeds to block 508.

In decision block 504, the original fetch address, abbreviated as "addr," is checked to verify it falls within the address range of the first partition, between remapping start and remapping end (e.g., first partition start address and first partition end address), which are stored in two registers of the processor(s) 108. If yes, "addr" is within the address range of the first partition, the processor(s) 108 proceeds to block 506; if no, "addr" is outside the address range of the first partition, the processor(s) 108 proceeds to block 508.

In block 506, the processor(s) 108 apply the offset stored in another register of the processor(s) 108 to remap (e.g., translate, convert, and redirect) the first partition address into the corresponding second partition address. For example, if the fetching address, "addr," is 0x02010000, the offset is 0x 00070000, then the remapped address would be 0x 0201A000+0x 00070000=0x0208A000. In response to obtaining the remapped address, the processor(s) 108 proceeds to block 508.

In block 508, the processor(s) 108 performs the fetch operation using the fetching address, "addr," which may be either the original fetching address or the remapped fetching address, depending on the outcomes of decision block 502 and decision block 504.

As a consequence, the address remapping enables the redirection of instruction fetch, between the first partition and the second partition. This provides the capability to designate either memory area as the active boot partition storing the firmware image.

Additionally, this remapping logic allows utilizing a single firmware update file that solely utilizes first partition addresses, rather than requiring separate versions of firmware update files with different address references. The processor(s) 108 execute this singular-version firmware from the current active partition by remapping address references.

The singular-version firmware reduces storage requirements and simplifies version tracking, firmware update process, and compatibility verification during updates. Finally, reliably installing the same image into any partition strengthens system robustness and lowers computing and bandwidth requirements.

In summary, the address translation approach efficiently solves practical firmware deployment constraints caused by hardware limitations in embedded devices. It enables firmware update files to be executed properly after loading into any memory partition. This efficiency delivers significant technical advantages related to update testing, storage use, and overall system resilience.

Figure 6:
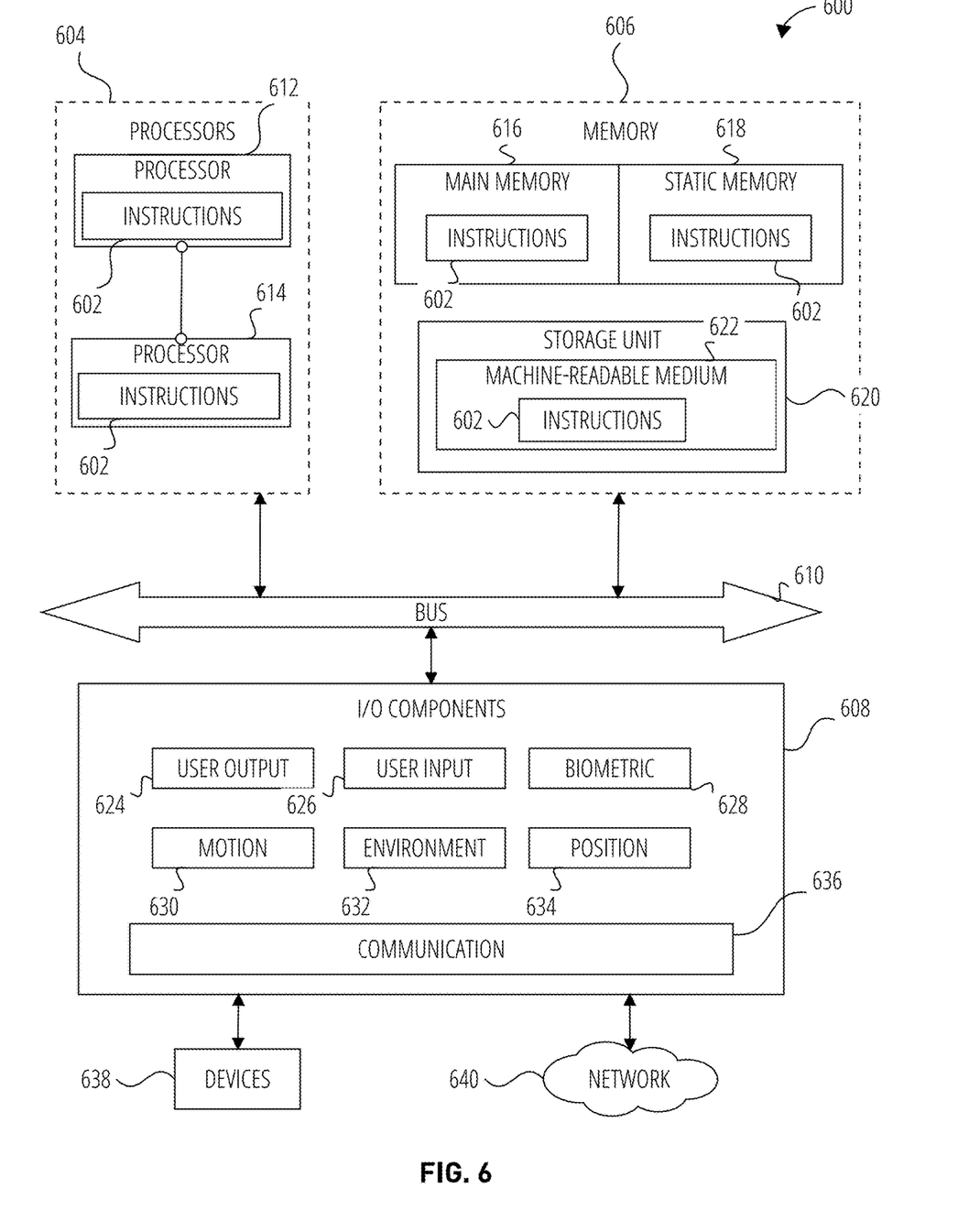
FIG. 6 is a diagrammatic representation of the machine 600, according to some examples.

FIG. 6 is a diagrammatic representation of the machine 600 within which instructions 602 (e.g., software, a program, an application, an applet, an app, or other executable code) for causing the machine 600 to perform any one or more of the methodologies discussed herein may be executed. For example, the instructions 602 may cause the machine 600 to execute any one or more of the methods described herein. The instructions 602 transform the general, non-programmed machine 600 into a particular machine 600 programmed to carry out the described and illustrated functions in the manner described. The machine 600 may operate as a standalone device or be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 602, sequentially or otherwise, that specify actions to be taken by the machine 600. Further, while a single machine 600 is illustrated, the term "machine" may include a collection of machines that individually or jointly execute the instructions 602 to perform any one or more of the methodologies discussed herein.

The machine 600 may include processors 604, memory 606, and I/O components 608, which may be configured to communicate via a bus 610. In some examples, the processors 604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application-Specific Integrated Circuit (ASIC), a Radio-Frequency Integrated Circuit (RFIC), another Processor, or any suitable combination thereof) may include, for example, a Processor 612 and a Processor 614 that execute the instructions 602. The term "Processor" is intended to include multi-core processors that may comprise two or more independent processors (sometimes referred to as "cores") that may execute instructions contemporaneously. Although FIG. 6 shows multiple processors 604, the machine 600 may include a single processor with a single core, a single processor with multiple cores (e.g., a multi-core processor), multiple processors with a single core, multiple processors with multiples cores, or any combination thereof.

The memory 606 includes a main memory 616, a static memory 618, and a storage unit 620, both accessible to the processors 604 via the bus 610. The main memory 616, the static memory 618, and storage unit 620 store the instructions 602 embodying any one or more of the methodologies or functions described herein. The instructions 602 may also reside, wholly or partially, within the main memory 616, within the static memory 618, within machine-readable medium 622 within the storage unit 620, within the processors 604 (e.g., within the processor's cache memory), or any suitable combination thereof, during execution thereof by the machine 600.

The I/O components 608 may include various components to receive input, provide output, produce output, transmit information, exchange information, or capture measurements. The specific I/O components 608 included in a particular machine depend on the type of machine. For example, portable machines such as mobile phones may include a touch input device or other such input mechanisms, while a headless server machine will likely not include such a touch input device. The I/O components 608 may include many other components not shown in FIG. 6. In various examples, the I/O components 608 may include user output components 624 and user input components 626. The user output components 624 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), or other signal generators. The user input components 626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 608 may include biometric components 628, motion components 630, environmental components 632, or position components 634, among a wide array of other components. For example, the biometric components 628 include components to detect expressions (e.g., hand expressions, facial expressions, vocal expressions, body gestures, or eye-tracking), measure biosignals (e.g., blood pressure, heart rate, body temperature, perspiration, or brain waves), or identify a person (e.g., voice identification, retinal identification, facial identification, fingerprint identification, or electroencephalogram-based identification). The motion components 630 include acceleration sensor components (e.g., accelerometer), gravitation sensor components, rotation sensor components (e.g., gyroscope). The environmental components 632 include, for example, one or cameras, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 634 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 608 further include communication components 636 operable to couple the machine 600 to a network 102 or devices 638 via respective coupling or connections. For example, the communication components 636 may include a network interface Component or another suitable device to interface with network 102. In further examples, the communication components 636 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 638 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Data glyph, Maxi Code, PDF417, Ultra Code, UCC RSS-2D bar code, and other optical codes), or acoustic detection components (e.g., microphones to identify tagged audio signals). In addition, a variety of information may be derived via the communication components 636, such as location via Internet Protocol (IP) geolocation, location via Wi-Fi® signal triangulation, or location via detecting an NFC beacon signal that may indicate a particular location.

The various memories (e.g., main memory 616, static memory 618, and/or memory of the processors 604) and/or storage unit 620 may store one or more sets of instructions and data structures (e.g., software) embodying or used by any one or more of the methodologies or functions described herein. These instructions (e.g., instructions 602), when executed by processors 604, cause various operations to implement the disclosed examples.

The instructions 602 may be transmitted or received over the network 102, using a transmission medium, via a network interface device (e.g., a network interface component included in the communication components 636) and using any one of several well-known transfer protocols (e.g., hypertext transfer protocol (HTTP)). Similarly, instructions 602 may be transmitted or received using a transmission medium via a coupling (e.g., a peer-to-peer coupling) to the devices 638.

The following enumerated descriptions describe various examples of methods, machine-readable media, and systems (e.g., machines, devices, or other apparatus) discussed herein. Any one or more features of an example, taken in isolation or combination, should be considered as being within the disclosure of this application.

Example 1 is a method for firmware update, comprising: determining a boot partition of a memory of an Execute-in-Place (XIP) system, the memory comprising a first partition and a second partition, and the boot partition comprising a plurality of instructions coded with first partition addresses; determining that the boot partition is the second partition; and based on determining that the boot partition is the second partition, redirecting one or more processors of the XIP system to execute the plurality of instructions from the second partition; storing a firmware update file in the first partition, the firmware update file comprising a plurality of updated instructions coded with first partition addresses; and setting the first partition to be the boot partition in response to the XIP system restarts.

In Example 2, the subject matter of Example 1 includes, wherein the redirecting the one or more processors of the XIP system to execute the plurality of instructions from the second partition comprises: accessing a fetch instruction associated with a first partition address; remapping the first partition address to a corresponding second partition address; and executing an instruction located in the corresponding second partition address.

In Example 3, the subject matter of Examples 1-2 includes, wherein the remapping the first partition address to the corresponding second partition address comprises: determining an offset between the first partition and the second partition; and determining the corresponding second partition address based on the offset and the first partition address.

In Example 4, the subject matter of Examples 1-3 includes, wherein: the first partition comprises a plurality of first partition addresses; and the second partition comprises a plurality of second partition addresses, each of the plurality of second partition addresses corresponds to each of the plurality of first partition addresses.

In Example 5, the subject matter of Examples 1-4 includes, wherein the redirecting the one or more processors of the XIP system to execute the plurality of instructions from the second partition comprises: assigning a true value to a register of the one or more processors to indicate that the address remapping is enabled; in response to assigning the true value to the register, storing a first partition start address, a first partition end address, and an offset between the first partition and the second partition; and determining that the fetching address is a first partition address based on the fetching address falls between the first partition start address and the first partition end address; and in response to determining that the fetching address is the first partition address, determining a remapped fetching address based on the fetching address and the offset; and fetching the plurality of instructions from the second partition based on the remapped fetching address.

In Example 6, the subject matter of Examples 1-5 includes, accessing the plurality of updated instructions from the firmware update file stored in the first partition; and executing the plurality of instructions coded with first partition addresses from the first partition.

In Example 7, the subject matter of Examples 1-6 includes, wherein: the memory further comprises a third partition, the third partition is independent from the first partition and the second partition; and a fetch instruction directed at the third partition is not remapped.

In Example 8, the subject matter of Examples 1-7 includes, wherein the memory is a memory of an Execute-in-Place (XIP) system, wherein the XIP system is without a hardware memory management unit (MMU).

Example 9 is a computing system, comprising: one or more processors; and a non-transitory memory storing instructions that, when executed by the one or more processors, configure the one or more processors to execute instructions comprising: determining a boot partition of a memory of an Execute-in-Place (XIP) system, the memory comprising a first partition and a second partition, and the boot partition comprising a plurality of instructions coded with first partition addresses; determining that the boot partition is the second partition; and based on determining that the boot partition is the second partition, redirecting one or more processors of the XIP system to execute the plurality of instructions from the second partition, storing a firmware update file in the first partition, the firmware update file comprising a plurality of updated instructions coded with first partition addresses, and setting the first partition to be the boot partition in response to the XIP system restarts.

In Example 10, the computing system of Example 9 includes, wherein the redirecting the one or more processors of the XIP system to execute the plurality of instructions from the second partition comprises: accessing a fetch instruction associated with a first partition address; remapping the first partition address to a corresponding second partition address; and executing an instruction located in the corresponding second partition address.

In Example 11, the computing system of Examples 9-10 includes, wherein the remapping the first partition address to the corresponding second partition address comprises: determining an offset between the first partition and the second partition; and determining the corresponding second partition address based on the offset and the first partition address.

In Example 12, the computing system of Examples 9-11 includes, wherein: the first partition comprises a plurality of first partition addresses; and the second partition comprises a plurality of second partition addresses, each of the plurality of second partition addresses corresponds to each of the plurality of first partition addresses.

In Example 13, the computing system of Examples 9-12 includes, wherein the redirecting the one or more processors of the XIP system to execute the plurality of instructions from the second partition comprises: assigning a true value to a register of the one or more processors to indicate that the address remapping is enabled; in response to assigning the true value to the register, storing a first partition start address, a first partition end address, and an offset between the first partition and the second partition, and determining that the fetching address is a first partition address based on the fetching address falls between the first partition start address and the first partition end address; and in response to determining that the fetching address is the first partition address, determining a remapped fetching address based on the fetching address and the offset, and fetching the plurality of instructions from the second partition based on the remapped fetching address.

In Example 14, the computing system of Examples 9-13 includes, wherein the instructions further comprising: accessing the plurality of updated instructions from the firmware update file stored in the first partition; and executing the plurality of instructions coded with first partition addresses from the first partition.

In Example 15, the computing system of Examples 9-14 includes, wherein the memory further comprises a third partition, the third partition is independent from the first partition and the second partition; and a fetch instruction directed at the third partition is not remapped.

In Example 16, the computing system of Examples 9-15 includes, wherein the memory is a memory of an Execute-in-Place (XIP) system, wherein the XIP system is without a hardware memory management unit (MMU).

Example 17 is a non-transitory computer-readable storage medium, the computer-readable storage medium including instructions that when executed by a computer, cause the computer to perform operations comprising: determining a boot partition of a memory of an Execute-in-Place (XIP) system, the memory comprising a first partition and a second partition, and the boot partition comprising a plurality of instructions coded with first partition addresses; determining that the boot partition is the second partition; and based on determining that the boot partition is the second partition, redirecting one or more processors of the XIP system to execute the plurality of instructions from the second partition, storing a firmware update file in the first partition, the firmware update file comprising a plurality of updated instructions coded with first partition addresses, and setting the first partition to be the boot partition in response to the XIP system restarts.

In Example 18, the non-transitory computer-readable storage medium of Example 17 includes, wherein the redirecting the one or more processors of the XIP system to execute the plurality of instructions from the second partition comprises: accessing a fetch instruction associated with a first partition address; remapping the first partition address to a corresponding second partition address; and executing an instruction located in the corresponding second partition address.

In Example 19, the non-transitory computer-readable storage medium of Examples 17-18 includes, wherein the remapping the first partition address to the corresponding second partition address comprises: determining an offset between the first partition and the second partition; and determining the corresponding second partition address based on the offset and the first partition address.

In Example 20, the non-transitory computer-readable storage medium of Examples 17-19 includes, wherein: the first partition comprises a plurality of first partition addresses; and the second partition comprises a plurality of second partition addresses, each of the plurality of second partition addresses corresponds to each of the plurality of first partition addresses.

What is claimed is:

1. A method for firmware update, comprising:
   receiving a first firmware update file, wherein the first firmware update file is coded with first partition addresses;
   determining that a boot partition of a memory of an Execute-in-Place (XIP) system is a second partition, the memory comprising a first partition and a second partition and the second partition comprising an initial firmware file coded with first partition addresses;
   based on determining that the boot partition is the second partition,
      remapping the first partition addresses to second partition addresses such that the initial firmware file coded with the first partition addresses is executable in the second partition;
      storing the first firmware update file in the first partition, and
      setting the first partition to be the boot partition in response to XIP system restarts;
   receiving a second firmware update file, wherein the second firmware update file is coded with the first partition addresses;
   determining that the boot partition of the memory is the first partition; and
   based on determining that the boot partition is the first partition,
      skipping a remapping from the first partition addresses to the second partition addresses;
      storing the second firmware update file in the second partition, and
      setting the second partition to be the boot partition in response to the XIP system restarts.

2. The method for firmware update of claim 1, wherein the remapping the first partition addresses to second partition addresses such that the initial firmware file coded with the first partition addresses is executable in the second partition comprises:
   accessing a fetch instruction associated with a first partition address;
   remapping the first partition address to a corresponding second partition address; and
   executing an instruction located in the corresponding second partition address.

3. The method for firmware update of claim 2, wherein the remapping the first partition address to the corresponding second partition address comprises:
  determining an offset between the first partition and the second partition; and
  determining the corresponding second partition address based on the offset and the first partition address.

4. The method for firmware update of claim 2, wherein:
  the first partition comprises a plurality of first partition addresses; and
  the second partition comprises a plurality of second partition addresses, each of the plurality of second partition addresses corresponds to each of the plurality of first partition addresses.

5. The method for firmware update of claim 4, wherein the remapping the first partition addresses to second partition addresses comprises:
  assigning a true value to a register of one or more processors to indicate that the address remapping is enabled;
  in response to assigning the true value to the register,
    storing a first partition start address, a first partition end address, and an offset between the first partition and the second partition, and
    determining that the fetching address is a first partition address based on the fetching address falls between the first partition start address and the first partition end address; and
    in response to determining that the fetching address is the first partition address,
      determining a remapped fetching address based on the fetching address and the offset, and
      fetching the first firmware update file from the second partition based on the remapped fetching address.

6. The method for firmware update of claim 1, further comprising:
  accessing the first firmware update file stored in the first partition; and
  executing the first firmware update file coded with first partition addresses from the first partition.

7. The method of claim 1, wherein:
  the memory further comprises a third partition, the third partition is independent from the first partition and the second partition; and
  a fetch instruction directed at the third partition is not remapped.

8. The method of claim 1, wherein the memory is a memory of an Execute-in-Place (XIP) system, wherein the XIP system is without a hardware memory management unit (MMU).

9. A computing system, comprising:
  one or more processors; and
  a non-transitory memory storing instructions that, when executed by the one or more processors, configure the one or more processors to execute instructions comprising:
    receiving a first firmware update file, wherein the first firmware update file is coded with first partition addresses;
    determining that a boot partition of a memory of an Execute-in-Place (XIP) system is a second partition, the memory comprising a first partition and a second partition and the second partition comprising an initial firmware file coded with first partition addresses
    based on determining that the boot partition is the second partition,
      remapping the first partition addresses to second partition addresses such that the initial firmware file coded with the first partition addresses is executable in the second partition;
    storing the first firmware update file in the first partition, and
    setting the first partition to be the boot partition in response to XIP system restarts;
    receiving a second firmware update file, wherein the second firmware update file is coded with the first partition addresses;
    determining that the boot partition of the memory is the first partition; and
    based on determining that the boot partition is the first partition,
      skipping a remapping from the first partition addresses to the second partition addresses,
      storing the second firmware update file in the second partition, and
      setting the second partition to be the boot partition in response to the XIP system restarts.

10. The computing system of claim 9, wherein the remapping the first partition addresses to second partition addresses such that the initial firmware file coded with the first partition addresses is executable in the second partition comprises:
  accessing a fetch instruction associated with a first partition address;
  remapping the first partition address to a corresponding second partition address; and
  executing an instruction located in the corresponding second partition address.

11. The computing system of claim 10, wherein the remapping the first partition address to the corresponding second partition address comprises:
  determining an offset between the first partition and the second partition; and
  determining the corresponding second partition address based on the offset and the first partition address.

12. The computing system of claim 10, wherein:
  the first partition comprises a plurality of first partition addresses; and
  the second partition comprises a plurality of second partition addresses, each of the plurality of second partition addresses corresponds to each of the plurality of first partition addresses.

13. The computing system of claim 12, wherein the remapping the first partition addresses to second partition addresses comprises:
  assigning a true value to a register of the one or more processors to indicate that the address remapping is enabled;
  in response to assigning the true value to the register,
    storing a first partition start address, a first partition end address, and an offset between the first partition and the second partition, and
    determining that the fetching address is a first partition address based on the fetching address falls between the first partition start address and the first partition end address; and
    in response to determining that the fetching address is the first partition address,
      determining a remapped fetching address based on the fetching address and the offset, and fetching the first firmware update file from the second partition based on the remapped fetching address.

14. The computing system of claim 9, wherein the instructions further comprising:
accessing the first firmware update file stored in the first partition; and
executing the first firmware update file coded with first partition addresses from the first partition.

15. The computing system of claim 9, wherein:
the memory further comprises a third partition, the third partition is independent from the first partition and the second partition; and
a fetch instruction directed at the third partition is not remapped.

16. The computing system of claim 9, wherein the memory is a memory of an Execute-in-Place (XIP) system, wherein the XIP system is without a hardware memory management unit (MMU).

17. A non-transitory computer-readable storage medium, the computer-readable storage medium including instructions that when executed by a computer, cause the computer to perform operations comprising:
receiving a first firmware update file, wherein the first firmware update file is coded with first partition addresses;
determining that a boot partition of a memory of an Execute-in-Place (XIP) system is a second partition, the memory comprising a first partition and a second partition and the second partition comprising an initial firmware file coded with first partition addresses;
based on determining that the boot partition is the second partition,
remapping the first partition addresses to second partition addresses such that the initial firmware file coded with the first partition addresses is executable in the second partition;
storing the first firmware update file in the first partition, and
setting the first partition to be the boot partition in response to XIP system restarts;
receiving a second firmware update file, wherein the second firmware update file is coded with the first partition addresses;
determining that the boot partition of the memory is the first partition; and
based on determining that the boot partition is the first partition,
skipping a remapping from the first partition addresses to the second partition addresses,
storing the second firmware update file in the second partition, and
setting the second partition to be the boot partition in response to the XIP system restarts.

18. The non-transitory computer-readable storage medium of claim 17, wherein the remapping the first partition addresses to second partition addresses such that the initial firmware file coded with the first partition addresses is executable in the second partition comprises:
accessing a fetch instruction associated with a first partition address;
remapping the first partition address to a corresponding second partition address; and
executing an instruction located in the corresponding second partition address.

19. The non-transitory computer-readable storage medium of claim 18, wherein the remapping the first partition address to the corresponding second partition address comprises:
determining an offset between the first partition and the second partition; and
determining the corresponding second partition address based on the offset and the first partition address.

20. The non-transitory computer-readable storage medium of claim 18, wherein:
the first partition comprises a plurality of first partition addresses; and
the second partition comprises a plurality of second partition addresses, each of the plurality of second partition addresses corresponds to each of the plurality of first partition addresses.

* * * * *